United States Patent [19]
Bader et al.

[11] 3,879,189
[45] Apr. 22, 1975

[54] CONTROL OF WEEDS WITH 1-PHENYL-4-PHOSPHORANYLIDENEAMINO-5-HALO-6(1H)-PYRIDAZONES

[75] Inventors: Joerg Bader, Arlesheim; Christian Vogel, Benningen, both of Switzerland

[73] Assignee: Ciba-Geigy Corporation, Ardsley, N.Y.

[22] Filed: May 2, 1974

[21] Appl. No.: 466,329

Related U.S. Application Data

[62] Division of Ser. No. 206,172, Dec. 8, 1971, Pat. No. 3,823,142.

[30] Foreign Application Priority Data
Dec. 15, 1970 Switzerland.................. 18554/70

[52] U.S. Cl............................ 71/86; 71/87; 71/88; 71/92
[51] Int. Cl............................................ A01n 9/36
[58] Field of Search........................... 71/92, 86, 87

[56] References Cited
UNITED STATES PATENTS

| | | | |
|---|---|---|---|
| 3,071,574 | 1/1963 | Brust | 71/86 |
| 3,557,208 | 1/1971 | Kuhn | 71/86 |
| 3,697,522 | 10/1972 | Reicheneder et al. | 71/92 |
| 3,776,950 | 12/1973 | Mitsch | 71/86 |

Primary Examiner—Glennon H. Hollrah
Attorney, Agent, or Firm—Frederick H. Rabin

[57] ABSTRACT

The invention is concerned with new pyridazone derivatives of formula

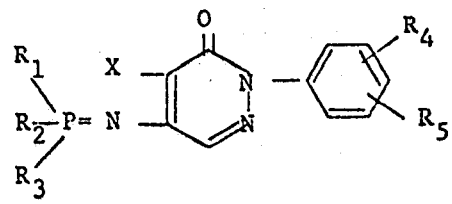

wherein $R_1$ and $R_2$ independently represent alkoxy, alkenyloxy, alkoxyalkoxy, alkylthio or both together with the phosphorus atom from a five- or six-membered ring containing at least one other hetero atom, $R_3$ is alkoxy, alkenyloxy, alkoxyalkoxy, alkylthio or dialkylamino, $R_4$ and $R_5$ are hydrogen, halogen, lower alkyl, alkoxy or halogenalkyl, X being chlorine or bromine. Preferably the three radicals $R_1$, $R_2$, $R_3$ are identical and represent lower alkoxy and $R_4$ and $R_5$ are hydrogen. There is also provided an agent for the control of weeds comprising the said pyridazone derivatives as active component. The new compounds are especially useful as selective herbicides in cultivated crops.

12 Claims, No Drawings

CONTROL OF WEEDS WITH 1-PHENYL-4-PHOSPHORANYLIDENEAMINO-5-Halo-6(1H)-PYRIDAZONES This is a division of application Ser. No. 206,172, filed on Dec. 8, 1971, now U.S. Pat. No. 3,823,142.

The present invention relates to new pyridazone derivatives, to processes for their production, also to herbicidal agents containing these new compounds as active substances, and to processes for the control of gramineous and dicotyledonous weeds by application of the new active substances or agents containing them.

The new pyridazone derivatives correspond to formula I:

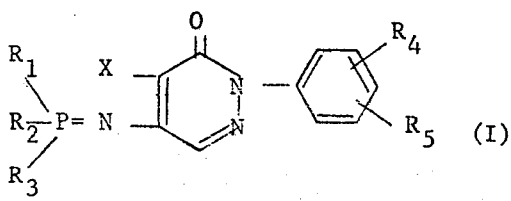

The symbols in this formula have the following meanings:

$R_1$ and $R_2$ each independently represent an optionally chlorinated alkoxy or alkenyloxy radical, an alkoxyalkoxy radical, an alkylthio radical, or both together with the phosphorus atom represent a five- or six-membered heterocyclic ring having at least one other hetero atom, $R_3$ represents an optionally chlorinated alkoxy or alkenyloxy radical, an alkoxyalkoxy radical, an alkylthio radical, or a low-molecular dialkylamino group, $R_4$ and $R_5$ each independently represent hydrogen, halogen, lower alkyl, alkoxy or halogenalkyl, and X represents chlorine or bromine.

Alkoxy or alkenyloxy radicals $R_1$, $R_2$ and $R_3$ contain at most 4 carbon atoms. Examples of these are the methoxy, ethoxy, n-propoxy, isopropoxy, n-butoxy, sec-butoxy, and tert-butoxy radicals, as well as the allyloxy and methallyloxy radicals. These radicals can be mono- or polysubstituted by chlorine. Alkoxyalkoxy radicals are likewise low-molecular, such as methoxyethoxy, ethoxyethoxy, etc.. Lower alkyl radicals having 1 to 4 carbon atoms in a straight or branched chain constitute the alkyl moiety of an alkylthio radical ($R_1$, $R_2$, $R_3$), or of a dialkylamino radical ($R_3$). Such substituents can be methyl, ethyl, propyl, isopropyl, as well as n-butyl and its isomers. These lower alkyl radicals and the aforementioned alkoxy radicals can also serve as substituents $R_4$ and $R_5$. Of the halogenalkyl radicals ($R_4$, $R_5$), the trifluoromethyl radical is particularly suitable. As the radicals $R_4$ and $R_5$, halogen can be bromine, chlorine, fluorine or iodine; X stands for chlorine or bromine. From the radicals $R_1$ and $R_2$ together with the phosphorus atom, five- or six-membered heterocyclic rings can be formed which contain, in addition, at least one nitrogen, oxygen and/or sulphur atom as a ring member.

Such pyridazone derivatives of formula I are preferred in which all three radicals $R_1$, $R_2$ and $R_3$, and, if not all, at least the radicals $R_1$ and $R_2$, are identical. The pyridazone derivatives which have proved exceptionally effective are those in which the radicals $R_1$ to $R_3$ are identical chloroalkoxy, alkylthio and, in particular, alkoxy radicals having 1 to 3 carbon atoms; and the radicals $R_4$ and $R_5$ both represent hydrogen, or the one is hydrogen and the other the trifluoromethyl group. The substituent X in 5-position can be chlorine or bromine, with bromine frequently being the preferred substituent.

The new pyridazone derivatives of formula I are obtained according to the present invention by the reaction of an azidopyridazone derivative of formula II:

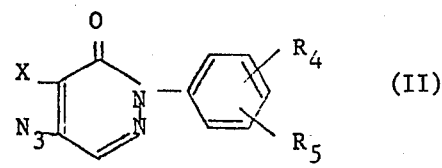

with a phosphorus compound of formula III:

In formulae II and III, $R_1$ to $R_5$ and X have the meanings given under formula I.

The reaction is advantageously performed in solvents or diluents which are inert to the reactants, e.g. in aliphatic, aromatic and halogenated hydrocarbons such as benzene, toluene, xylene, methylene chloride, chloroform, chlorobenzene; ketones such as acetone, methyl ethyl ketone; ethers and ethereal compounds such as dialkyl ether, dioxane, tetrahydrofuran; nitriles such as acetonitrile; N,N-dialkylated amides such as dimethylformamide, diethylformamide; sulphoxides such as dimethylsulphoxide, etc., as well as mixtures of such solvents with each other. The reaction temperatures are between −10° and 50°C.

The starting materials of formula II are in some cases known: 1-phenyl-4-azido-5-chloro-6(1H)-pyridazone from the U.S. Pat. No. 3,210,354, and 1-phenyl-4-azido-5-bromo-6(1H)-pyridazone from C.A. 70, 47382 m. The azidopyridazones substituted in the phenyl radical have not hitherto been described; they can be obtained, however, by application of the processes described in the citations.

A further process for the preparation of the new pyridazone derivatives of formula I entails the reaction of a 4-aminopyridazone of formula IV:

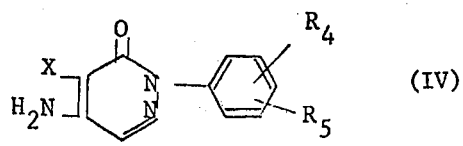

wherein $R_4$, $R_5$ and X are defined as under formula I, with phosphorus pentachloride to give a compound of the formula:

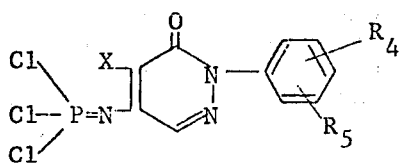

and the replacement in this compound of the chlorine atoms on the phosphorus, by reaction with corresponding alcohols, mercaptans and dialkylamines, by radicals $R_1$, $R_2$ and $R_3$.

Some 4-aminopyridazones of formula IV are known from DAS 1,105,232, and others can by easily produced by the methods described therein.

The following example illustrates the production of the new pyridazone derivatives of formula I. The temperatures are given in degrees Centigrade.

EXAMPLE

An amount of 9 g of 1-phenyl-4-azido-5-chloro-6(1H)-pyridazone is dissolved in methylene chloride, and to this solution are added, with stirring, 4.6 g of trimethylphosphite. The reaction occurs with spontaneous heating and evolution of nitrogen. The methylene chloride is distilled off after 15 minutes, and the solid residue recrystallised from methanol. In this manner are obtained 9 g of 1-phenyl-4-(trimethoxyphosphoranylidene-amino)-5-chloro-6(1H)-pyridazone in the form of colourless needles; M.P. 105°–106°. (Compound No. 1)

In the following table are listed further compounds of Formula I

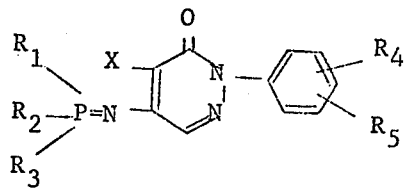

which were produced by application of the process described in the previous example:

| No. | $R_1$ | $R_2$ | $R_3$ | $R_4$ | $R_5$ | X | Melting point |
|---|---|---|---|---|---|---|---|
| 2 | $CH_3O$ | $CH_3O$ | $(CH_3)_2N$ | H | H | Cl | 67–68° |
| 3 | $-S-CH_2-CH_2-S-$ | | $(CH_3)_2N$ | H | H | Cl | 115–116° |
| 4 | $n-C_4H_9O$ | $n-C_4H_9O$ | $n-C_4H_9O$ | H | H | Cl | oil |
| 5 | $ClCH_2CH_2O$ | $ClCH_2CH_2O$ | $ClCH_2CH_2O$ | H | H | Cl | oil |
| 6 | $C_2H_5O$ | $C_2H_5O$ | $C_2H_5O$ | H | H | Cl | oil |
| 7 | $i-C_3H_7O$ | $i-C_3H_7O$ | $i-C_3H_7O$ | H | H | Cl | 88–89° |
| 8 | $i-C_3H_7O$ | $i-C_3H_7O$ | $i-C_3H_7O$ | H | H | Br | 74–75° |
| 9 | $CH_3O$ | $CH_3O$ | $CH_3O$ | H | H | Br | 98–99° |
| 10 | $C_2H_5O$ | $C_2H_5O$ | $C_2H_5O$ | H | H | Br | 51–52° |
| 11 | $CH_3O$ | $CH_3O$ | $CH_3O$ | 3-$CF_3$ | H | Cl | 50–51° |
| 12 | $C_2H_5O$ | $C_2H_5O$ | $C_2H_5O$ | 3-$CF_3$ | H | Cl | oil |
| 13 | $CH_3O$ | $CH_3O$ | $(CH_3)_2N-$ | 3-$CF_3$ | H | Cl | oil |
| 14 | $CH_3O$ | $CH_3O$ | $CH_3O$ | 3-Cl | H | Cl | 83–84° |
| 15 | $CH_3O$ | $CH_3O$ | $(CH_3)_2N$ | H | H | Br | oil |
| 16 | $ClCH_2CH_2O$ | $ClCH_2CH_2O$ | $ClCH_2CH_2O$ | H | H | Br | |
| 17 | $CH_3O$ | $CH_3O$ | $CH_3O$ | 3-$CF_3$ | H | Br | |
| 18 | $CH_3O$ | $CH_3O$ | $CH_3O$ | 3-Cl | H | Br | |
| 19 | $C_2H_5O$ | $C_2H_5O$ | $C_2H_5O$ | 3-Br | H | Br | |
| 20 | $CH_3O$ | $CH_3O$ | $CH_3O$ | 3-I | H | Br | |
| 21 | $C_2H_5O$ | $C_2H_5O$ | $C_2H_5O$ | 2-Cl | H | Br | |
| 22 | $CH_3O$ | $CH_3O$ | $CH_3O$ | 4-Cl | H | Br | |

—Continued

| No. | $R_1$ | $R_2$ | $R_3$ | $R_4$ | $R_5$ | X | Melting point |
|---|---|---|---|---|---|---|---|
| 23 | $CH_3O$ | $CH_3O$ | $CH_3O$ | 3-$CH_3$ | H | Br | |
| 24 | $CH_3O$ | $CH_3O$ | $CH_3O$ | 4-$CH_3O$ | H | Br | |
| 25 | $CH_3O$ | $CH_3O$ | $CH_3O$ | 3-Cl | 5-$CH_3$ | Br | |
| 26 | $CH_3S$ | $CH_3S$ | $CH_3S$ | H | H | Br | 112–121° |
| 27 | $CH_3S$ | $CH_3O$ | $CH_3O$ | H | H | Br | |
| 28 | -N($CH_3$)-$CH_2$-$CH_2$-O- | | $CH_3O$ | H | H | Br | |
| 29 | n-$C_3H_7O$ | n-$C_3H_7O$ | n-$C_3H_7O$ | H | H | Br | |
|    | n-$C_3H_7O$ | n-$C_3H_7O$ | n-$C_3H_7O$ | H | H | Cl | |
| 30 | $C_2H_5O$ | $CH_3O$ | $CH_3O$ | H | H | Br | |
| 31 | -O-$CH_2$-$CH_2$-O- | | $CH_3O$ | H | H | Br | |
| 32 | i-$C_3H_7O$ | $CH_3O$ | $CH_3O$ | H | H | Br | |
| 33 | $CH_3O$ | $CH_3O$ | $CH_3O$ | 4-F | H | Cl | |
| 34 | $CH_3S$ | $CH_3S$ | $CH_3S$ | H | H | Cl | 156–158 |
| 35 | n-$C_3H_7O$- | n-$C_3H_7O$ | n-$C_3H_7O$ | H | H | Cl | oil |
| 36 | n-$C_4H_9O$ | n-$C_4H_9O$ | n-$C_4H_9O$ | H | H | Br | oil |
| 37 | -O-$CH_2CH_2$-O- | | $CH_3O$ | H | H | Cl | |
| 38 | -O-$CH_2$-$CH_2$-O- | | $CH_3O$ | H | H | Br | |
| 39 | -O-$CH_2$-CH-O-<br>         \|<br>        $CH_3$ | | $CH_3O$ | H | H | Cl | |
| 40 | -O-$CH_2$-CH-O-<br>         \|<br>        $CH_3$ | | $CH_3O$ | H | H | Br | |
| 41 | -O($CH_2$)$_3$-O- | | $CH_3O$ | H | H | Cl | |
| 42 | -O-($CH_2$)$_3$-O | | $CH_3O$ | H | H | Br | |
| 43 | -O-CH-CH-O-<br>    \|   \|<br>   $CH_3$ $CH_3$ | | $CH_3O$ | H | H | Cl | |
| 44 | -O-CH-CH-O-<br>    \|   \|<br>   $CH_3$ $CH_3$ | | $CH_3O$ | H | H | Br | |

Listed below in the table are further compounds of formula I wherein the three radicals $R_1$, $R_2$ and $R_3$ are identical and $R_4$ and $R_5$ each represent hydrogen:

| No | $R_1 = R_2 = R_3$ | X | Melting point |
|---|---|---|---|
| 45 | $CH_2 = C-CH_2O-$<br>      \|<br>     $CH_3$ | Cl | |

| No. | $R_1 = R_2 = R_3$ | X | Melting point |
|---|---|---|---|
| 46 | $CH_2=\underset{CH_3}{\overset{|}{C}}-CH_2O-$ | Br | |
| 47 | $CH_2=CH-CH_2-O-$ | Cl | oil |
| 48 | $CH_2=CH-CH_2-O-$ | Br | oil |
| 49 | $CH_3-CH=CH-CH_2O-$ | Cl | |
| 50 | $CH_3-CH=CH-CH_2O-$ | Br | |
| 51 | $CH_2=\underset{Cl}{\overset{|}{C}}-CH_2O-$ | Cl | |
| 52 | $CH_2=\underset{Cl}{\overset{|}{C}}-CH_2O-$ | Br | |
| 53 | $ClCH=CH-CH_2O-$ | Cl | |
| 54 | $ClCH=CH-CH_2O-$ | Br | |
| 55 | $Cl-(CH_2)_3-O-$ | Cl | |
| 56 | $Cl-(CH_2)_3-O-$ | Br | |
| 57 | $Cl-(CH_2)_4-O-$ | Cl | |
| 58 | $Cl-(CH_2)_4-O-$ | Br | |
| 59 | $CH_3-O-CH_2-CH_2-O-$ | Cl | |
| 60 | $CH_3-O-CH_2-CH_2-O-$ | Br | |
| 61 | $C_2H_5O-CH_2-CH_2-O-$ | Cl | |
| 62 | $C_2H_5O-CH_2-CH_2-O-$ | Br | |

In the following table are listed azidipyridazone starting materials of formula II which have not been hitherto described:

| Starting materials | Melting point |
|---|---|
| 1-(3'-chlorophenyl)-4-azido-5-chloro-6(1H)-pyridazone | 137° |
| 1-(3'-trifluoromethyl-phenyl)-4-azido-5-chloro-6(1H)-pyridazone | 73° – 74° |
| 1-(3'-trifluoromethyl-phenyl)-4-azido-5-bromo-6(1H)-pyridazone | 75° – 76° |
| 1-(3'-chlorophenyl)-4-azido-5-bromo-6-(1H)-pyridazone | |
| 1-(3'-bromophenyl)-4-azido-5-bromo-6-(1H)-pyridazone | |
| 1-(3'-iodophenyl)-4-azido-5-bromo-6(1H)-pyridazone | |
| 1-(2'-chlorophenyl)-4-azido-5-bromo-6(1H)-pyridazone | |
| 1-(4'-chlorophenyl)-4-azido-5-bromo-6(1H)-pyridazone | |
| 1-(3'-methyl-phenyl)-4-azido-5-bromo-6(1H)-pyridazone | |
| 1-(4'-methoxyphenyl)-4-azido-5-bromo-6(1H)-pyridazone | |
| 1-(3'-chloro-5'-methyl-phenyl)-4-azido-5-bromo-6(1H)-pyridazone | |
| 1-(4'-fluorophenyl)-4-azido-5-chloro-6(1H)-pyridazone | |

The pyridazone derivatives of formula I possess excellent herbicidal properties, and are particularly suitable for the control of gramineous and broad-leaved weeds in various cultivated crops. Applied in high concentrations, the new compounds act as total herbicides; in low concentrations, on the other hand, they act as selective herbicides. Annual and perennial types of weeds which are deep-rooted and difficult to control are destroyed or damaged in growth with a high degree of success by the active substances of formula I. Application of the new active substances can be effected, with the same high level of success, before emergence (pre-emergence) and after emergence (post-emergence). Field weeds such as, e.g. millet varieties (*Panicum spp.*), mustard varieties (*Sinapis spp.*), goosefoot varieties (*Chenopodiaceae*), slender foxtail (*Alopecurus spp.*) and other pig weed varieties, e.g. *Amarantus spp.*, grasses, e.g. *Lolium spp.*, compositae, e.g. *Taraxacum spp.*, wild chamomile varieties (*Matricaria spp.*), are thus destroyed or inhibited in growth without damage being caused to useful plants, such as grain, maize, cotton, sorghum, soya beans and sugar beet. The applied amount vary and are dependent on the time of application; they are between 0.1 to 10 kg of active substance per hectare; in the case of application before emergence of the plants, the amount is up to 1 kg of active substance per hectare, and after emergence of the plants the amount is 3 to 10 kg of active substance per hectare. For the total destruction, however, of the whole weed crop, e.g., on the fallow land adjacent to the cultivated land, it is necessary to apply more than 10 kg of active substance per hectare. The operation of the normal crop rotation is not impaired in consequence of application of the new active substances.

Herbicidal Action With Application Of The Active Substances Before Emergence Of The Plants (Pre-emergence Application).

a. The active substance as a 10% powder concentrate is worked into garden soil, the applied amount being such that, after the spreading out of the soil, the concentration is 3 g of active substance per square metre of soil (e.g. 60 mg of active substance per litre of soil, 5 cm deep). The following test plants are sown in the prepared soil contained in seed trays:

*Solanum lycopersianum,*
*Setaria italica,*
*Avena sativa,*
*Lolium perenne,*
*Sinapis alba,*
*Vicia sativa.*

The seed trays are then kept in a greenhouse at 22°–25° with 50 to 70% relative humidity in daylight. Evaluation of the test results is made after 20 days.
Evaluation:
9 = plants undamaged = control,
1 = plants dead,
2–8 = intermediate stages of damage.
Composition of the Powder Concentrate
10 Parts of active substance, 0.6 parts of sodium dibutyl-naphthalene sulphonate, 1 part of naphthalene-sulphonic acid/phenolsulphonic acid/formaldehyde condensate (3:2:1), 10 parts of sodium aluminium silicate, 78.4 parts of kaolin.

| Active substance | Solanum lycopersianum | Setaria italica | Avena sativa | Lolium perenne | Sinapis alba | Vicia sativa |
|---|---|---|---|---|---|---|
| 1-Phenyl-4-(dimethoxy-dimethylamino-phosphoranylideneamino)-5-chloro-6(1H)-pyridazone | 1 | 1 | 2 | 1 | 1 | 1 |
| 1-Phenyl-4-[(1',4'-dithiatetramethylene)-dimethyl-amino-phosphoranylideneamino]-5-chloro-6(1H)-pyridazone | 1 | 1 | 1 | 1 | 1 | 1 |
| 1-Phenyl-4-(tris-n-butoxy-phosphoranylideneamino)-5-chloro-6(1H)-pyridazone | 1 | 2 | 2 | 2 | 1 | 1 |
| 1-Phenyl-4-(tris-ethoxy-phosphoranylideneamino)-5-chloro-6(1H)-pyridazone | 1 | 1 | 1 | 1 | 1 | 1 |
| 1-Phenyl-4-(tris-methoxy-phosphoranylideneamino)-5-chloro-6(1H)-pyridazone | 1 | 1 | 1 | 1 | 1 | 1 |
| 1-Phenyl-4-tris-ethoxy-phosphoranylideneamino)-5-bromo-6(1H)-pyridzone | 1 | 1 | 1 | 1 | 1 | 1 |
| 1-(5'-Chlorphenyl)-4-(tris-methoxy-phosphoranylideneamino)-5-chloro-6(1H)-pyridazone | 1 | 1 | 1 | 1 | 1 | 1 |
| 1-Phenyl-4-(tris-β-chloroethoxy-phosphoranylideneamino-5-chloro-6(1H)-pyridazone | 1 | 1 | 1 | 1 | 1 | 2 |
| 1-Phenyl-4-(tris-n-propoxy-phosphoranylideneamino)-5-bromo-6(1H)-pyridazone | 1 | 1 | 1 | 1 | 1 | 1 |
| 1-Phenyl-4-(tris-n-propoxy-phosphoranylideneamino)-5-chloro-6(1H)-pyridazone | 1 | 1 | 3 | 1 | 1 | 1 | b. Immediately after the sowing of the test plants, the active substances are applied, as aqueous suspensions obtained from a 25% wettable powder, to the surface of the soil. The seed trays are then kept at 22°–23° and with 50–70% relative humidity. The results of the tests are evaluated after 28 days.
The following were used as test plants:
Weeds:
*Alopecurus myosuroides*
*Ipomea purpurea*
*Lolium multiflorum*
*Poa trivialis*
*Setaria italica*
*Sinapis alba*
*Echinochloa crus galli*
*Digitaria sanguinalis*
Useful plants: Sugar beet
The respective amounts applied in this test are shown in the following table.

The evaluation is on the basis of a scale of 9 values (see Test a).

| Active Substance | Amount applied in kg/hectare | Lolium multiflorum | Poa tiveglis | qlopecurus myosuroides | Digitaria sanquinalis | setaria italica | Echinochloa crus galli | sinapis alba | Ipomea purpurea | Sugar beet |
|---|---|---|---|---|---|---|---|---|---|---|
| 1-Phenyl-4-(tris-methoxy-phosphoranylideneamino)-5-bromo-6(1H)-pyridazone | 2 | 2 | 1 | 2 | 1 | 1 | 1 | 1 | 1 | 9 |
|  | 1 | 3 | 1 | 3 | 2 | 2 | 3 | 2 | 2 | 9 |
|  | 0.5 | 4 | 1 | 3 | 3 | 2 | 5 | 2 | 7 | 9 |
| 1-Phenyl-4-amino-5-chloro-pyridazone-(6) | 2 | 7 | 1 | 3 | 3 | 2 | 4 | 3 | 6 | 9 |
|  | 1 | 8 | 3 | 6 | 3 | 3 | 7 | 4 | 9 | 9 |
| (known from the German Auslegeschrift 1,105,232) | 0.5 | 8 | 4 | 8 | 9 | 7 | 9 | 5 | 9 | 9 |

For the preparation of herbicidal agents, the active substances are mixed with suitable carriers and/or distributing agents. In order to broaden the effective range of action, it is possible to add to these agents other herbicides, e.g. from the series of triazines such as halogen-diamino-s-triazines, alkoxy- and alkylthiodiamino-s-triazines, triazoles, diazines such as uracils, aliphatic carboxylic acids and halogenocarboxylic acids, halogenated benzoic acids and phenylacetic acids, aryloxyalkanecarboxylic acids, hydrazides, amides, nitriles, esters of such carboxylic acids, carbamic acid esters and thiocarbamic acid esters, ureas, etc.

Representative compounds of such herbicidal active substances which can be added are, e.g.:
2-chloro-4,6-bis-(ethylamino)-s-triazine,
2-chloro-4-ethylamino-6-isopropylamino-s-triazine,
2-chloro-4,6-bis-(methoxypropylamino)-s-triazine,
2-methoxy-4,6-bis-(isopropylamino)-s-triazine,
2-diethylamino-4-isopropylacetamido-6-methoxy-s-triazine,
2-isopropylamino-4-methoxypropylamino-6-methylthio-s-triazine,
2-methylthio-4,6-bis-(isopropylamino)-s-triazine,
2-methylthio-4,6-bis-(ethylamino)-s-triazine,
2-methylthio-4-ethylamino-6-isopropylamino-s-triazine,
2-methoxy-4-ethylamino-6-isopropylamino-s-triazine,
2-methoxy-4,6-bis-(ethylamino)-s-triazine,
2-chloro-4,6-bis-(isopropylamino)-s-triazine,
5-bromo-3-sec-butyl-o-methyl-uracil,
5-amino-5-chloro-1-phenyl-pyridazone-(6),
3,6-dioxo-1,2,3,6-tetrahydropyridazine,
dinitro-sec-butyl-phenol and its salts
pentachlorophenol and its salts
trichloroacetic acid and its salts,
2,2-dichloropropionic acid and its salts,
2-chloro-N,N-diallylacetic acid amide,
maleic acid hydrazide,
2,3,6-trichlorobenzoic acid and its salts
2,3,5,6-tetrachlorobenzoic acid and its salts,
2-methoxy-3,5,6-trichlorobenzoic acid and its salts,
2-methoxy-3,6-dichlorobenzoic acid and its salts,
3-amino-2,5-dichlorobenzoic acid and its salts,
3-nitro-2,5-dichlorobenzoic acid and its salts,
2-methyl-3,6-dichlorobenzoic acid and its salts,
2,6-dichlorobenzonitrile,
2,6-dichlorothiobenzamide,
2,3,6-trichlorophenylacetic acid and its salts,
2,4-dichlorophenoxyacetic acid and its salts,
2,4,5-trichlorophenoxyacetic acid, its salts and esters,
(2-methyl-4-chlorophenoxy)-acetic acid, its salts and esters,
2-(2,4,5-trichlorophenoxy)-propionic acid, its salts and esters,
2-(2,4,5-trichlorophenoxy)-ethyl-2,2-dichloropropionate,
4-(2,4-dichlorophenoxy)-butyric acid, its salts and esters,
4-(2-methyl-4-chlorophenoxy)-butyric acid, its salts and esters,
2,3,6-trichlorobenzyloxypropanol,
4-amino-3,5,6-trichloropicolinic acid,
N'-cyclooctyl-N,N-dimethylurea,
3-phenyl-1,1-dimethylurea,
3-(4'-chlorophenyl)-1,1-dimethylurea,
3-(3'-trifluoromethylphenyl)-1,1-dimethylurea,
3-(3',4'-dichlorophenyl)-1,1-dimethylurea,
3-(3',4'-dichlorophenyl)-1-n-butyl-1-methylurea,
3-(3',4'-dichlorophenyl)-1,1,3-trimethylurea,
3-(3',4'-dichlorophenyl)-1,1-diethylurea,
3-(4'-chlorophenyl)-1-methoxy-1-methylurea,
3-(3',4'-dichlorophenyl)-1-methoxy-1-methylurea,
3-(4'-bromophenyl)-1-methoxy-1-methylurea,
3-(3',4'-dichlorophenyl)-3-methoxy-1,1-dimethylurea,
3-(4'-chlorophenoxyphenyl)-1,1-dimethylurea,
N,N-di-(n-propyl)-S-ethyl-thiocarbamic acid ester,
N,N-di-(n-propyl)-S-n-propyl-thiocarbamic acid ester,
N-ethyl-N-(n-butyl)-S-n-propyl-thiocarbamic acid ester,
N-phenyl-O-isopropyl-carbamic acid ester,
N-(m-chlorophenyl)-O-isopropyl-carbamic acid ester,
N-(m-chlorophenyl)-O-4-chlorobutin-(2)-yl-carbamic acid ester,
N-(3',4'-dichlorophenyl)-O-methyl-carbamic acid ester.

Herbicidal agents according to the invention are produced in a manner known per se by the intimate mixing and grinding of active substances of the general formula I with suitable carriers, optionally with the addition of dispersing agents or solvents which are inert to the active substances. The active substances can be obtained and used in the following forms:

solid preparations:
  dusts, scattering agents, granulates, (coated granulates, impregnated granulates and homogeneous granulates);
water-dispersible concentrates of the active substance:
  wettable powders, pastes, emulsions;
liquid preparations:
  solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminum silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm; for scattering agents from about 0.075 to 0.2 mm; and for granulates 0.2 mm or coarser.

The concentrations of active substance in the solid preparation forms are from 0.5 to 80%.

To these mixtures may also be added additives stabilising the active substance, and/or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, ligninsulphonic acid, its alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm, and in the case of pastes not exceeding 0.03 mm. For the preparation of emulsion concentrates and pastes are used dispersing agents such as those mentioned in the preceding paragraphs, organic solvents, and water. Suitable solvents are, e.g. the following: alcohols, benzene, xylenes, toluene, dimethylsulphoxide, and mineral oil fractions boiling in the range of 120° to 350°. The solvents must be practically odourless, non-phytotoxic, inert to the active substances, and not readily inflammable.

Furthermore, the agents according to the invention can be used in the form of solutions. For this purpose, the active substance (or several active substances) is (or are) dissolved in suitable organic solvents, mixtures of solvents, or water. As organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20%.

To the described agents according to the invention may be added other biocidal active substances or agents. For the widening of their sphere of action, the new agents may also contain, in addition to the stated compounds of the general formula I, e.g. insecticides, fungicides, bactericides, fungistatics, bacteriostatics or nematocides. The agents according to the invention can also contain fertilisers, trace elements, etc.

In the following are described preparations of the new active substances of the general formula I. The term 'parts' denotes parts by weight.

Granulate

The following substances are used for the preparation of a 5% granulate:

| | |
|---|---|
| 5 | parts of 1-phenyl-4-(dimethoxy-dimethylamino-phosphoranylideneamino)-5-chloro-6(1H)-pyridazone, |
| 0.25 | parts of epichlorohydrin, |
| 0.25 | parts of cetyl polyglycol ether, |
| 3.50 | parts of polyethylene glycol, |
| 91.00 | parts of kaolin (particle size 0.3 to 0.8 mm). |

The active substance is mixed with epichlorohydrin and the mixture dissolved in 6 parts of acetone; to the solution are then added polyethylene glycol and cetyl polyglycol ether. The thus obtained solution is sprayed on to kaolin, and subsequently evaporated in vacuo.

Wettable Powder

The following constituents are used for the preparation of: (a) a 50%, (b) a 25%, and (c) a 10% wettable powder:

| | | | |
|---|---|---|---|
| a) | 50 | parts of | 1-phenyl-4-(tris-ethoxy-phosphoranylidene-amino)-5-bromo-6(1H)-pyridazone, |
| | 5 | parts of | sodium dibutylnaphthyl sulphonate, |
| | 3 | parts of | naphthalenesulphonic acid/phenol-sulphonic acid/formaldehyde condensate 3:2:1, |
| | 20 | parts of | kaolin, |
| | 22 | parts of | Champagne chalk; |
| b) | 25 | parts of | 1-phenyl-4-(tris-methoxy-phosphoranylidene-amino)-5-bromo-6(1H)-pyridazone, |
| | 5 | parts of | the sodium salt of oleylmethyl tauride, |
| | 2.5 | parts of | naphthalenesulphonic acid/formaldehyde/ condensate, |
| | 0.5 | parts of | carboxymethyl cellulose, |
| | 5 | parts of | neutral potassium aluminium silicate, |
| | 62 | parts of | kaolin; |
| c) | 10 | parts of | 1-phenyl-4-(tris-n-butoxy-phosphoranylidene-amino)-5-chloro-6(1H)-pyridazone, |
| | 3 | parts of | a mixture of the sodium salts of saturated fatty alcohol sulphates, |
| | 5 | parts of | naphthalenesulphonic acid/formaldehyde condensate, |
| | 82 | parts of | kaolin. |

The stated active substance is absorbed on to the appropriate carriers (kaolin and chalk), and the whole subsequently mixed and ground. Wettable powders having excellent wettability and suspension properties are thus obtained. Suspensions of any desired concentration of active substance can be prepared from the said wettable powders by dilution with water. Such suspensions are applied for the control of weeds and wild grasses in cultivated crops.

Paste

The following substances are used for the preparation of a 45% paste:

| | | |
|---|---|---|
| 45 | parts of | 1-phenyl-4-(tris-methoxy-phosphoranylidene-amino)-5-chloro-6(1H)-pyridazone. |
| 5 | parts of | sodium aluminium silicate. |
| 14 | parts of | cetyl polyglycol ether having 8 moles of ethylene oxide. |
| 1 | part of | oleylpolglycol ether having 5 moles of ethylene oxide. |
| 2 | parts of | spindle oil. |
| 10 | parts of | polyethylene glycol. |
| 23 | parts of | water. |

The active substance is intimately mixed and ground, in suitable devices, with the additives. A paste is thus obtained from which can be prepared, by dilution with water, suspensions of any desired concentration. The suspensions are suitable for the treatment of vegetable crops.

Emulsion Concentrate

The following constituents are mixed together for the preparation of a 25% emulsion concentrate:

| | | |
|---|---|---|
| 25 | parts of | 1-phenyl-4-(tris-methoxy-phosphoranylidene-amino)-5-bromo-6(1H)-pyridazone. |
| 5 | parts of | a mixture of nonylphenolpolyoxyethylene and calcium dodecylbenzenesulphonate. |
| 35 | parts of | 3,5,5-trimethyl-2-cyclohexen-1-one. |
| 35 | parts of | dimethylformamide. |

This concentrate can be diluted with water to obtain emulsions of suitable concentration. Such emulsions are suitable for the control of weeds in cultivated crops, such as, e.g. cotton, maize, etc.

We claim:

1. A composition for the control of gramineous and dicotyledenous weeds comprising an effective amount of (1) a compound of the formula

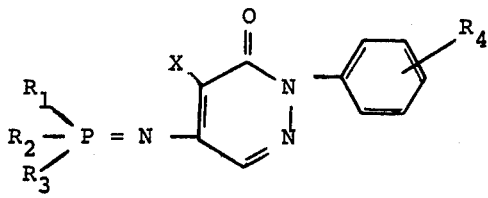

wherein $R_1$, $R_2$ and $R_3$ are identical and represent alkoxy, chloroalkoxy or alkylthio in which the alkyl moieties have from 1 to 4 carbon atoms; $R_4$ represents hydrogen or trifluoromethyl; and X represents chlorine or bromine; and (2) an inert carrier.

2. A composition according to claim 1 in which $R_1$, $R_2$ and $R_3$ represent alkoxy having from 1 to 3 carbon atoms; and $R_4$ represents hydrogen.

3. A composition according to claim 2 in which the compound is 1-phenyl-4-(tris-ethoxy-phosphoranylideneamino)-5-bromo-6(1H)-pyridazone.

4. A method for controlling gramineous and dicotyledenous weeds which comprises applying to the locus thereof a herbicidally effective amount of a compound of the formula

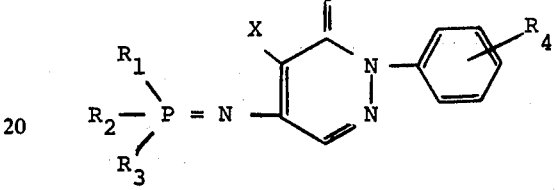

wherein $R_1$, $R_2$ and $R_3$ are identical and represent alkoxy, chloroalkoxy or alkylthio in which the alkyl moieties have from 1 to 4 carbon atoms; $R_4$ represents hydrogen or trifluoromethyl; and X represents chlorine or bromine.

5. A method according to claim 4 in which $R_1$, $R_2$ and $R_3$ represent alkoxy having from 1 to 3 carbon atoms; and $R_4$ represents hydrogen.

6. A method according to claim 5 in which X represents bromine.

7. A method according to claim 6 in which the compound is 1-phenyl-4-(tris-methoxy-phosphoranylideneamino)-5-bromo-6(1H)-pyridazone.

8. A method according to claim 6 in which the compound is 1-phenyl-4-(tris-ethoxy-phosphoranylideneamino)-5-bromo-6(1H)-pyridazone.

9. A method according to claim 6 in which the compound is 1-phenyl-4-(tris-n-propoxy-phosphoranylideneamino)-5-bromo-6(1H)-pyridazone.

10. A method according to claim 4 in which the compound is 1-phenyl-4-(tris-methylthio-phosphoranylideneamino)-5-bromo-6(1H)-pyridazone.

11. A method according to claim 5 in which the compound is 1-phenyl-4-(tris-methoxy-phosphoranylideneamino)-5-chloro-6(1H)-pyridazone.

12. A method according to claim 4 in which the compound is 1-phenyl-4-(tris-β-chloroethoxy-phosphoranylideneamino)-5-chloro-6(1H)-pyridazone.

* * * * *